United States Patent [19]

Kulik

[11] Patent Number: 4,763,609
[45] Date of Patent: Aug. 16, 1988

[54] ANIMAL LEASH

[76] Inventor: Bruce Kulik, 104 Fuhrman Ave., Ramsey, N.J. 07446

[21] Appl. No.: 932,525

[22] Filed: Nov. 20, 1986

[51] Int. Cl.⁴ .............................................. A01K 1/00
[52] U.S. Cl. ................................................... 119/109
[58] Field of Search .................... 119/109, 106; 54/23, 54/24; 128/77; 272/139

[56] References Cited

U.S. PATENT DOCUMENTS

| | | | | |
|---|---|---|---|---|
| 1,556,362 | 10/1925 | Silbert | ...................................... | 54/24 |
| 2,526,140 | 10/1950 | Keyston | ................................... | 54/24 |
| 2,861,547 | 11/1958 | Dale | ....................................... | 119/109 |
| 3,416,220 | 12/1968 | Wilson | .................................. | 128/77 |

FOREIGN PATENT DOCUMENTS 559918  7/1958  Canada ................................ 119/109

Primary Examiner—Gene Mancene
Attorney, Agent, or Firm—W. Patrick Quast

[57] ABSTRACT

An animal leash having a middle section, a first end section and a second end section, with the middle section having a pair of rings at each end, and with each end section having one end portion connected to one of the adjacent rings and another end portion having a connector for connection to the other adjacent ring for forming a loop at one end, both ends, or opposite end of the leash, as required.

4 Claims, 1 Drawing Sheet

U.S. Patent  Aug. 16, 1988  4,763,609
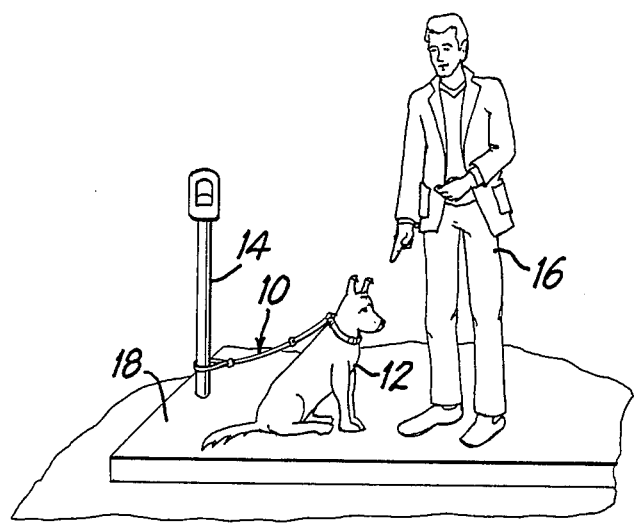
FIG. 1
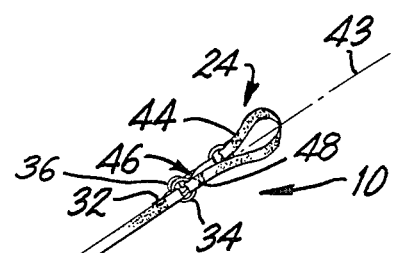
FIG. 2
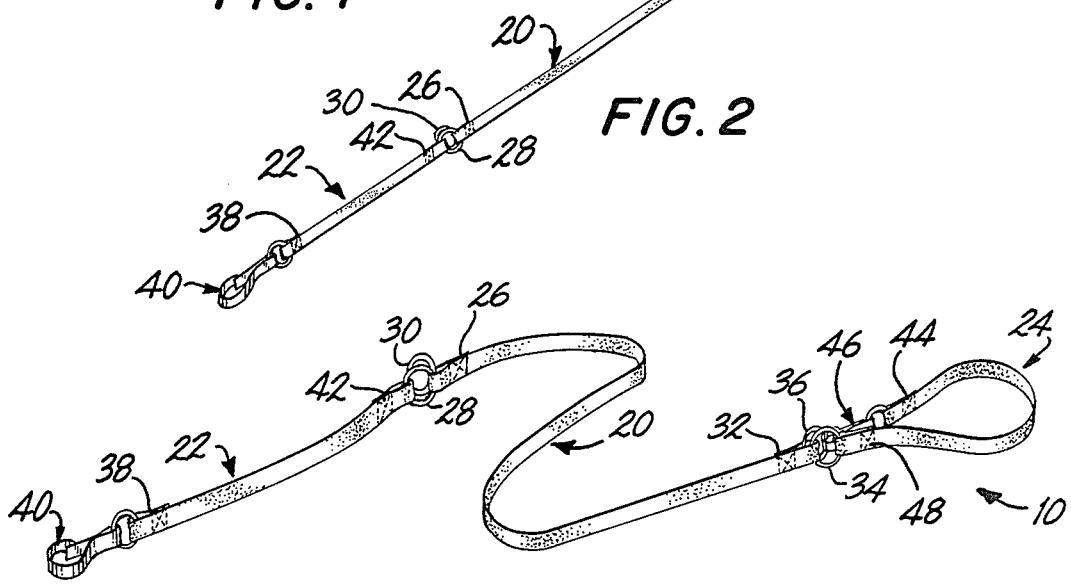
FIG. 3
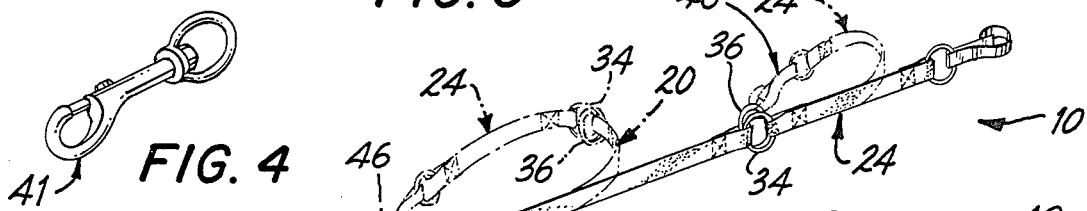
FIG. 4
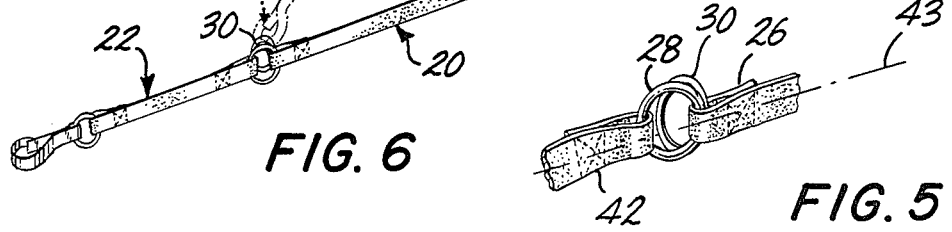
FIG. 6
FIG. 5

ANIMAL LEASH

BACKGROUND OF THE INVENTION

The present invention relates to an animal leash and in particular to a dog leash having a pair of rings and a connector at each end thereof.

The prior art animal leash includes an elongate middle section, a handle section at one end thereof, and a snap-on connector at the other end thereof.

The problem with the prior art animal leash is that it is not possible to loop the handle section around a fixed standing member such as a tree.

Another problem with the prior art animal leash is that it is not possible to connect the animal to the snap-on connector if the animal is not wearing a collar with a ring.

SUMMARY OF THE INVENTION

According to the present invention, an animal leash is provided to overcome the above-mentioned problems. The animal leash includes an elongate middle section having a pair of rings at each end thereof; a first elongate end section composed of a flexible material having a first end portion connected to one of said rings at one end of the middle section; and, a second elongate end section composed of a flexible material having a first end portion connected to one of said rings at the other end of the middle section. Each end section has a second end portion having a snap-on connector.

By using the animal leash according to the present invention, the problems of the prior art animal leash are overcome, as a loop of two different diameters can be turned when required.

The above advantages of the present invention will be more readily understood by reference to the following drawings.

BRIEF DESCRIPTION OF THE DRAWINGS

FIG. 1 is a perspective view of an animal, which is connected to a fixed object by an animal leash, according to the present invention.

FIG. 2 is an enlarged perspective view of the animal leash in a straight condition.

FIG. 3 is another enlarged perspective view of said animal leash in a flexed condition.

FIG. 4 is an enlarged detail of an alternate embodiment of a portion of FIG. 3.

FIG. 5 is another enlarged detail of the embodiment of a portion of FIG. 3.

FIG. 6 is another enlarged perspective view of the animal leash according to the present invention.

DETAILED DESCRIPTION OF THE INVENTION

In FIG. 1, an animal leash 10 is shown, for leading or restraining an animal. Leash 10 connects an animal 12 to a fixed object 14 such as a parking meter. A person 16 is shown standing alongside the animal 12. Object 14 can also be a sign post, or a tree, instead of a parking meter. Object 14 is fixedly connected to the ground 18, such as a concrete pavement.

In FIG. 2 and in FIG. 3, leash 10 is shown respectively in a straight condition and in a flexed condition. Leash 10 has an elongate middle section 20, a first elongate end section 22, and a second elongate end section 24.

Middle section 20 has a first end portion 26, which has two rings 28, 30 connected thereto, and has an opposite, second end portion 32, which has two rings 34, 36 connected thereto.

First end section 22 has a first end portion 38 connected to a snap-on connector 40 and has a second end portion 42 connected to ring 28 only.

Second end section 24 similarly has a first end portion 44 connected to a snap-on connector 46 and has a second end portion 48 connected to ring 34 only.

In FIG. 4, hook 41 is shown in an enlarged view, as a casting type of hook, as one preferred hook embodiment. Hook 40, in FIG. 3, is shown as a bent strip type of hook.

In FIG. 5, ring 30, which is a loose ring, is shown, when looking at the far side, instead of when looking at the near side. Ring 28, which is a tied ring, is tied to both portions 26 and 42. Loose ring 30 is tied only to portion 26. In FIG. 5, the rings 28 and 30 are dumped over, or rotated about the longitudinal axis 43 of leash 10, in its straight condition, for a better view of ring 30. Ring 30 is similarly connected, at the opposite end of middle section 26.

In FIG. 6, another enlarged perspective view of leash 10 is shown in three different conditions: a straight condition with straight end sections shown in solid lines; a first, small loop condition, where snap-on connector 46 on section 24 is connected to the near free ring 36 to form a hand loop or a loop suitable to secure the leash and animal to a relatively narrow fixed structure 14 such as a pole or parking meter; and, a second, large loop condition, where snap-on connector 46 is connected to free ring 30 to form a large loop comprising sections 20 and 24. The latter arrangement can secure the leash and animal to larger objects such as a tree.

Sections 20, 22, 24 of leash 10, in a preferred embodiment, in FIG. 6, is made of a flexible material, such as nylon or leather, or the like, in any color. Rings 28, 30, 34, 36 are made of a non-corrosive metal. Hook 40 is also made of a non-corrosive metal. Middle section 20 can vary in length, e.g. 30 inches and longer, to accommodate the customer's needs. End section 22 and end section 24, each has a length of about 16 inches. Section 24 is considered the hand end, and section 22 is considered the animal end, but the leash 10 is reversible, so that section 24 can be the animal end and section 22 can be the hand end adding to the versatility of the leash.

The advantages of leash 10 are that the leash is reversible; the leash 10 can have a loop formed at one end, or both ends as required; the leash can have a loop of different diameters; etc.

Although the invention is described in one embodiment, the scope is only limited by the following claims.

What is claimed is:

1. An animal leash comprising:
   a middle section;
   a first end section; and
   a second end section;
   said first end section and said second end section being composed of a flexible material;
   said middle section having a first end loop portion with first and second rings connected thereto and having a second end loop portion with third and fourth rings connected thereto;
   said first end section having a third end loop portion looped through a manually operated connector and having a fourth loop portion looped through the first ring, and said second end section having a fifth end loop portion looped through a manually operated connector and having a sixth end loop portion looped through the third ring, whereby either connector can be connected to the second ring or connected to the fourth ring.

2. The leash of claim 1, wherein the middle section is composed of a flexible material.

3. The leash of claim 1, wherein each said connector is a snap-on connector.

4. The leash of claim 1, wherein the first end section is identical to the second end section, for ease of manufacture and ease of use.

* * * * *